(12) United States Patent
Groeneveld et al.

(10) Patent No.: US 8,302,487 B2
(45) Date of Patent: Nov. 6, 2012

(54) MULTI-STAGED AUDIBLE/VISIBLE INDICATOR FOR PROGRESSIVE OVERLOAD CONDITION

(75) Inventors: Paul Henry Groeneveld, Sherwood Park (CA); Timothy Eric Peterson, Edmonton (CA); Michael Stanley Chyzowski, Sherwood Park (CA)

(73) Assignee: Samuel Manu-Tech Inc., Etobicoke, Ontario (CA)

( * ) Notice: Subject to any disclaimer, the term of this patent is extended or adjusted under 35 U.S.C. 154(b) by 385 days.

(21) Appl. No.: 12/726,740

(22) Filed: Mar. 18, 2010

(65) Prior Publication Data
US 2011/0226928 A1    Sep. 22, 2011

(51) Int. Cl.
*G01N 3/08* (2006.01)
(52) U.S. Cl. .......................................................... 73/834
(58) Field of Classification Search ................. 73/760, 73/826, 830, 834
See application file for complete search history.

(56) References Cited

U.S. PATENT DOCUMENTS

| | | | | |
|---|---|---|---|---|
| 3,861,441 A * | 1/1975 | Oyoun | ........................... | 152/528 |
| 4,022,210 A * | 5/1977 | Glassman | ..................... | 604/394 |
| 4,413,730 A * | 11/1983 | Morse | ........................... | 206/232 |
| 4,793,494 A * | 12/1988 | Gordon, Jr. | ............ | 229/120.011 |
| 5,004,266 A * | 4/1991 | Miller et al. | ............... | 280/743.2 |
| 5,018,663 A * | 5/1991 | Corso | ..................... | 229/117.13 |
| 5,486,669 A * | 1/1996 | Oshgan | ........................ | 200/556 |
| 5,981,137 A * | 11/1999 | Meschter et al. | ............. | 430/208 |
| 6,304,698 B1 * | 10/2001 | Morris | ........................... | 385/100 |
| 6,777,126 B1 * | 8/2004 | Allen | ............................. | 429/434 |
| 7,887,231 B2 * | 2/2011 | Suchan et al. | ................ | 366/130 |

* cited by examiner

*Primary Examiner* — Max Noori
(74) *Attorney, Agent, or Firm* — Gowling Lafleur Henderson LLP

(57) ABSTRACT

An elongated assembly, such as a belt or a sling, having a first end and a second end. The first and second ends are configured to accept a tensile load applied thereto. The elongated assembly comprises a first folded region audibly/visibly ruptureable at a first threshold loading condition and a second folded region audibly/visibly ruptureable at a second threshold loading condition, the first threshold loading condition being lower than the second threshold loading condition, to provide a physical indication in stages for a progressively increasing overload condition.

18 Claims, 3 Drawing Sheets

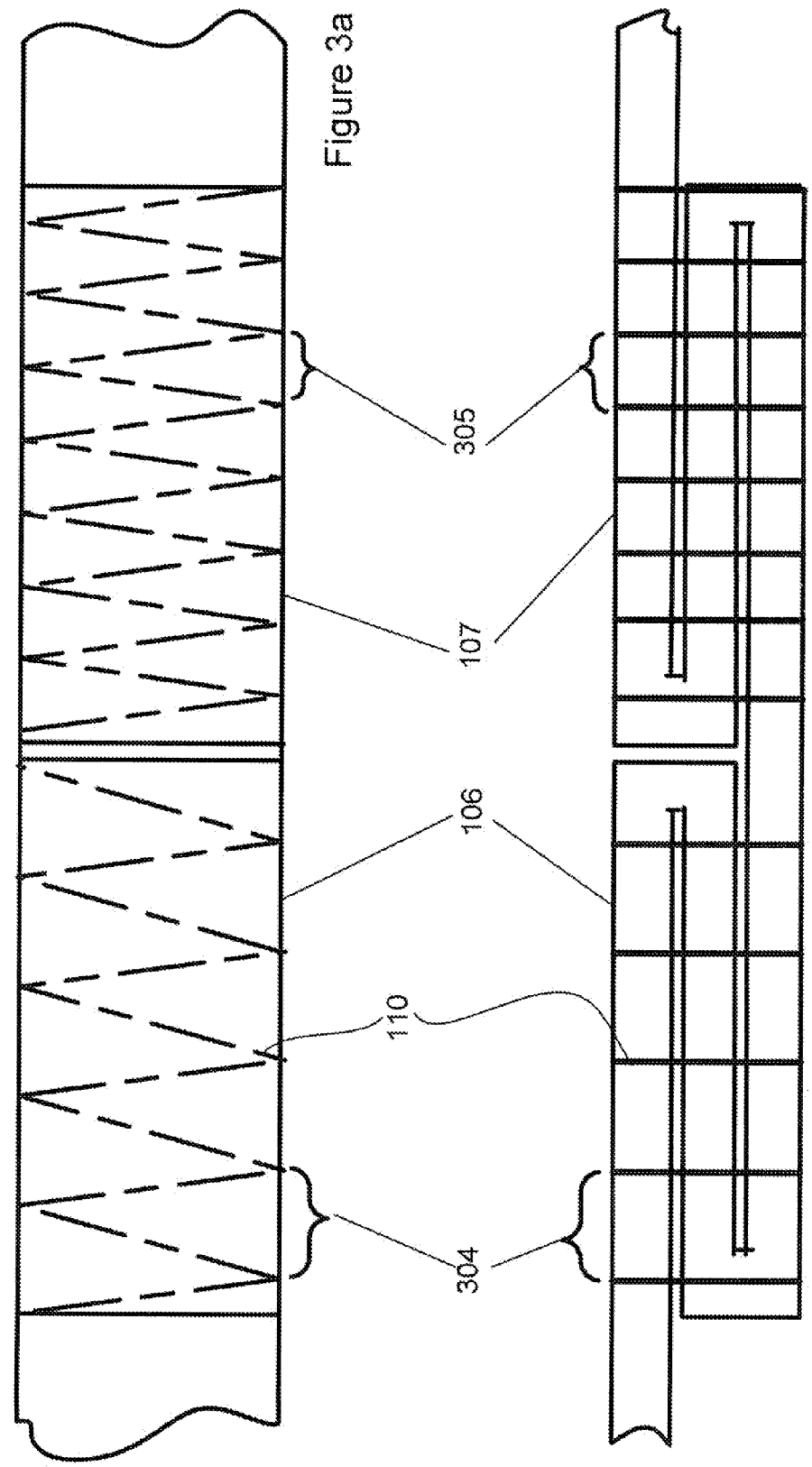

MULTI-STAGED AUDIBLE/VISIBLE INDICATOR FOR PROGRESSIVE OVERLOAD CONDITION

FIELD

The present disclosure relates generally to an apparatus and method for providing a physical indication of the existence of a progressively increasing, undesired overload condition.

BACKGROUND

Crane hooks are generally required to be tied back for loading and transportation of the crane. The purpose of the tie back is to prevent damage to the crane boom and other crane carrier components potentially resulting from uncontrolled swinging of the crane hook load, or load block.

In a relatively common situation where the crane operator, due to some temporary inattentiveness or incapacitation, does not remove the tie back, typically a standard wire rope or a sling constructed of synthetic material, begins to advance the boom upward, that tie back will break once its ultimate tensile strength is exceeded, releasing the load block with destructive force.

It would therefore be advantageous to provide a physical indication, such as an audible or visible indication, to forewarn the crane carrier operator, and any bystanders, of a potentially destructive situation involving such a progressively increasing overload condition.

SUMMARY OF THE INVENTION

Provided is an elongated assembly having a first end and a second end, the first and second ends configured to accept a tensile load applied thereto. The elongated assembly, which in exemplary embodiments may be flexible or semi-rigid, comprises a first folded region audibly/visibly ruptureable at a first threshold loading condition, and a second folded region audibly/visibly ruptureable at a second threshold loading condition, the first threshold loading condition being lower than the second threshold loading condition.

Also provided is a method for indicating a progressively-staged tensile overload condition of an elongated assembly. The method comprises audibly/visibly rupturing a first folded region of the elongated assembly at a first threshold overload condition, and audibly/rupturing a second folded region of the elongated assembly at a second threshold overload condition, the first threshold loading condition being lower than the second threshold loading condition.

BRIEF DESCRIPTION OF THE DRAWINGS

Embodiments will now be described by way of example only, with reference to the following drawings in which:

FIG. 3a is a conceptual diagram showing a side view of the exemplary sling of FIG. 1; and FIG. 3b is a conceptual diagram showing an end view of the exemplary sling of FIG. 3a.

DETAILED DESCRIPTION

Described in the context of the tie back for the crane block load is an apparatus and method for providing a physical indication, such as an audible or visible indication, to warn the operator, and any bystanders, of a potentially destructive situation involving a progressively increasing overload condition, yet doing so while still maintaining full control of the crane block load. The physical indication may also be provided in multiple stages, accordingly to provide multiple stages of warning as the undesired overload condition progressively increases.

The term "audible/visible" will be used herein to mean that the physical indication provided is audible and visible, with reference to someone in the immediate vicinity of the overloading activity. A variation of that term, more specifically, "audibly/visibly", is also used in a similar manner.

Figure 1:
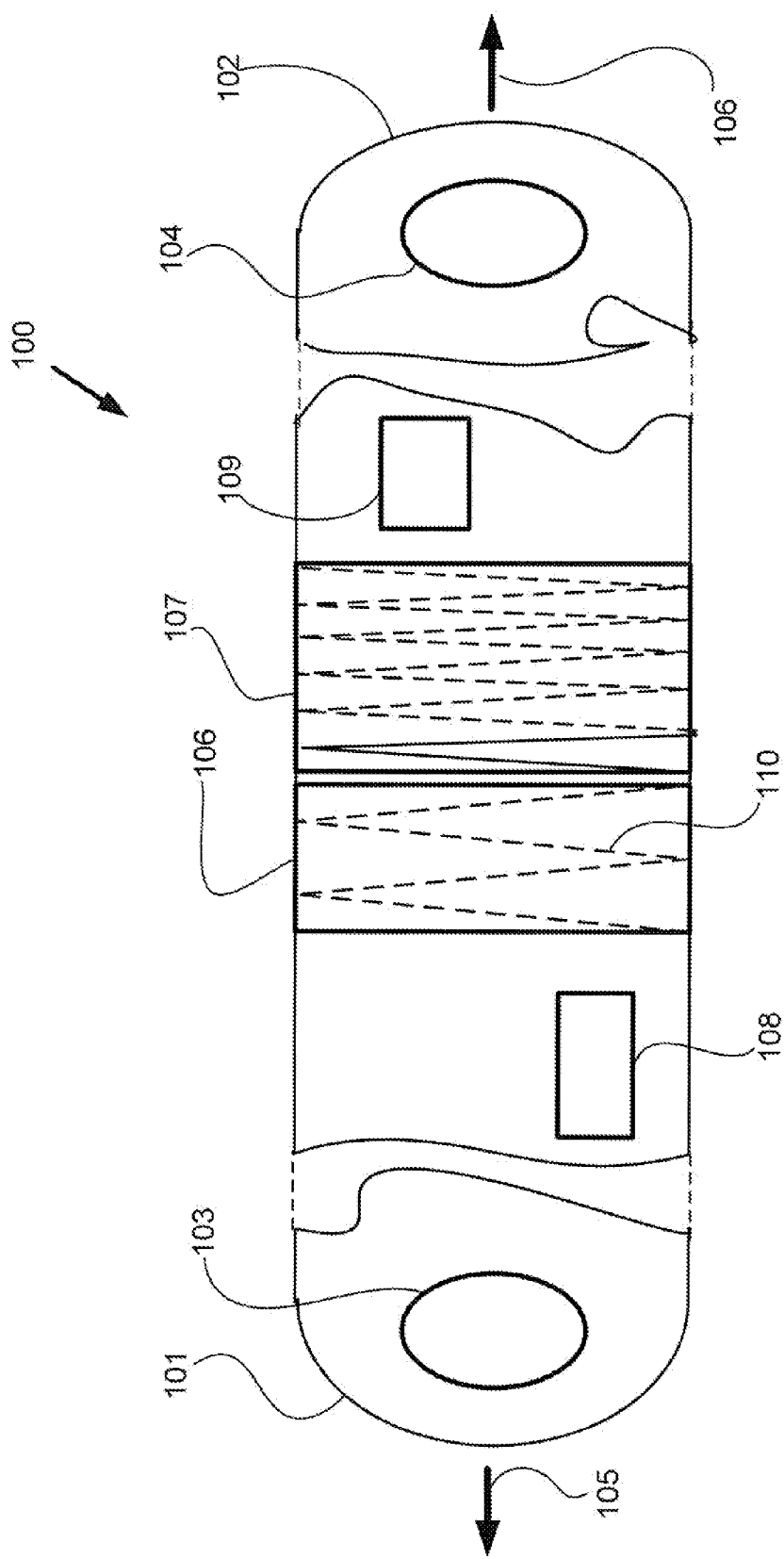
FIG. 1 illustrates an embodiment of the multi-staged audible/visible indicator within an exemplary context of a sling for securing a crane block during transportation by a crane carrier.

Referring now more particularly to the accompanying figures, FIG. 1 illustrates an exemplary embodiment of the multi-staged audible/visible indicator within an exemplary context of a sling 100 for securing a crane block during transportation by a crane carrier.

An elongated flexible or semi-rigid assembly such as sling 100 has a first end 101 and a second end 102. First end 101 of sling 100 may be a crane carrier end and second end 102 may be the load block end. Sling 100 may be fabricated of woven nylon webbing material, or other material. First end 101 includes a first eyelet 103 and second end 102 includes a second eyelet 104. Tensile loading, or overloading, may be applied in directions 105 and 106 as indicated, the tensile loading being accepted by sling 100 via eyelets 103, 104. Although FIG. 1 illustrates an embodiment of sling 100 having eyelets 103, 104 formed therewithin, other configurations are contemplated, such as sling loops formed from the webbing material of sling 100 at first and second ends 101 and adapted to accept the tensile loading along directions 105, 106.

Sling 100 may comprise a first folded region 106 and a second folded region 107. Each folded region, as will be described in further detail later with reference to FIG. 2, comprise a portion of the webbing material of sling 100 folded back upon itself, typically in a fold length ranging from 3 inches to 8 inches, and secured in such a folded disposition by stitching 110.

Stitching 110 is typically comprised of fabric threads, although other fastening means, including staples, are contemplated. Stitching 110 may be of a regular pattern, of an irregular pattern, or some combination thereof, across folded regions 106, 107, or any portions or folded regions 106, 107. Stitching 110 is generally selected, and configured as described below, to provide an audible emission upon rupturing.

Sling 100 may comprise appropriate labels for product usage, safety, and maintenance. In an exemplary embodiment, warnings label 108 may specify any or all of:

"This device is not intended for, and may not be used for, lifting or pulling applications. It is intended for use, and must be used, only as a crane block tie back for securing crane block hooks during transportation of a crane carrier".

"This device is intended to provide an audible and visible warning that the boom sections, load line, whip line, crane block and headache ball are under significant, undesired loading. Care and attention must be paid upon the warning being exhibited, and immediate action must be taken to diminish the tension on the load line and the whip line."

In another exemplary embodiment, instruction label 109, helpful for ensuring proper installation, usage and maintenance, may specify any or all of:

"This device must be installed only by a qualified crane operator."

"This device must be inspected thoroughly before installation and use. Any stitching that has been torn or any of the sewing threads or yarn used on the sling body that are loose may indicate that an overload condition has previously occurred, and the device must not be used, and must be replaced".

"Place the labelled hook end of this device in the hook of the crane block, or the hook of the headache ball, and secure the hook latch in the closed position".

"Secure the labelled crane carrier end of this device to the carrier body of the crane with a shackle. The shackle pin must be a minimum of one inch in diameter, preferably a 1¼" G 2130 style safety shackle. Tighten the pin into the body of the shackle or secure the nut to the pin of the shackle and insert the cotter pin."

"Care must be taken that the device when installed is flat, and without any twists, turns, or convolutions."

"Tension the device carefully with the load line or whip line of the crane until the slack is removed. The device when installed properly should be taut but not overly tensioned. If during tightening a warning is exhibited, the device can no longer be used and must be discarded."

"After transportation, release the tension slowly on the main load line or whip line and allow the device to go slack. Remove it from the hook and the carrier body".

"Store the device in a cool, dry area, out of direct sunlight. Do not pressure wash this device".

Figure 2:
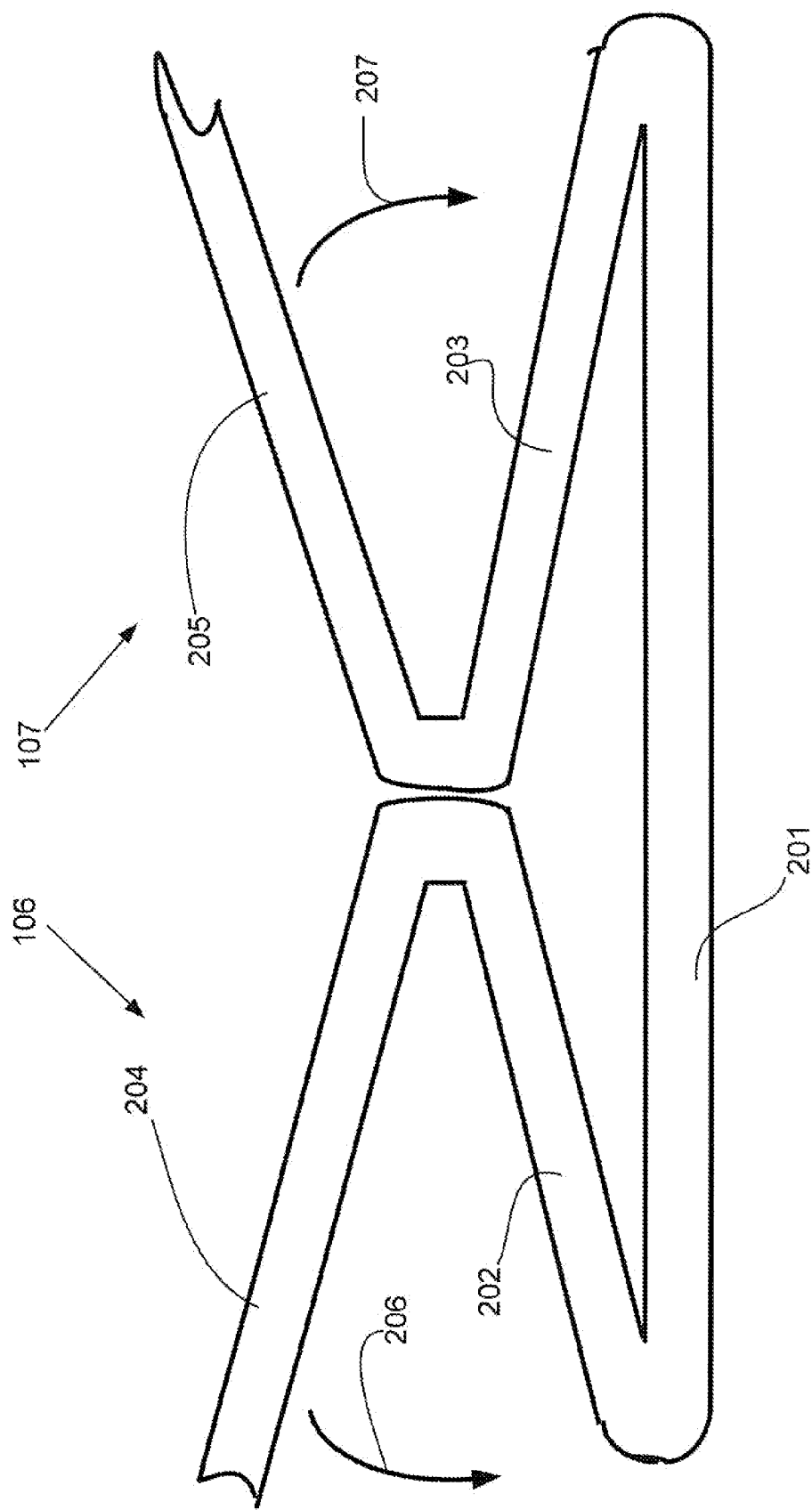
FIG. 2 is a conceptual diagram illustrating an exemplary configuration for creating folded regions of the exemplary sling of FIG. 1.

FIG. 2 is a conceptual diagram illustrating an exemplary configuration and folding sequence for creating folded regions of the exemplary sling 100 of FIG. 1. First and second folded regions 106, 107 may be created by folding webbing material of sling 100 in the manner depicted. Base portion 201 comprises a base portion of both folded regions 106, 107. Upon base portion 201 is folded middle portion 202 of first folded region 106. Middle portion 203 of second folded region 107 is folded upon base portion 201. Top portion 204 of first folded region 106 is then folded over middle portion 202 in a direction 206, while in mirror-image manner, top portion 205 of second folded region 107 is folded upon middle portion 203 in a direction 207. The fold length of second folded region 107 may be selected to be longer than the fold length of first folded region 106, to accomplish a relatively longer rupturing process that will provide a longer duration of audible/visible warning by the rupturing thereof.

In order to accomplish multi-staged indication of increasing tensile loads, first folded region 106 may be configured to rupture at a lower threshold force level than second folded region 107. It is apparent that all rupturing threshold load levels, even if yet a third folded region is added, are selected to be lower than the ultimate tensile breaking strength of sling 100.

Rupturing threshold load levels for any one of first and second folded regions 106, 107 may be configured by an iterative and interactive process of varying the stitch parameters, including stitching patterns, applied thereon. For instance, by varying stitching parameters such as number of stitches, pitch of stitching used in a stitching pattern, stitch thread gauge, stitch thread diameter, stitch thread material, cumulative stitch length and stitch length per unit area, the rupture strength of folded regions 106, 107 may be customized.

Thus, in one exemplary embodiment, first folded region 106 may be configured to rupture at an applied tensile load (along directions 102, 103 as depicted in FIG. 1) of about 31% of the ultimate tensile breaking strength of sling 100, while second folded region 107 may be configured to rupture at a higher load threshold of about 50% of the ultimate tensile breaking strength of sling 100. For instance with regard to this exemplary embodiment, sling 100 comprised a six-inch wide nylon webbing material sling having an ultimate breaking strength of 48,000 pounds. After a trial and error process, linear stitch patterns were used to create first and second folded regions 106, 107 having rupture thresholds of 15,000 pounds and 21,500 pounds respectively. First folded region 106 included 13 lines of stitching and second folded region included 20 lines of stitching, the stitches applied onto a fold length of four inches for each folded region, in this exemplary embodiment. It was further discovered that, with the four inch length of folded region, the block did not travel excessively, as block travel was limited to 8 inches after rupturing, while maintaining the requisite rupture load threshold.

It is apparent that rupturing of folded region 106, 107 comprises audible/visible rupturing of the stitching 110 respectively securing folded regions 106, 107 in a folded disposition, as the applied tensile load along directions 102, 103 reaches and exceeds the rupturing load threshold of a respective folded region 106, 107.

In exemplary embodiments, stitching 105 may comprise a T-600 bonded nylon thread size 554 having a rupturing strength of 77.7 lbs, or a T-400 bonded nylon thread size 415 having a rupturing strength 73.3 lbs. Both selections of thread material provide a very audible, and visible, indication of rupturing of a folded region as a progressively increasing tensile load is applied to sling 100, eventually exceeding the applicable threshold rupture strength for a given folded region.

Sling 100 may have a top side and a bottom side (not shown). First folded region 106 and second folded region 107 are depicted as co-located and disposed abutting each other in FIGS. 1 and 2, as well located on a same side of sling 100. It was discovered that such arrangement provides fullest control of displacement and swinging of the crane block load and block load end 102 during "pay out" from rupturing of one or both of the folded regions 106, 107. While other folding techniques, sequences and arrangements for folded regions 106, 107 within sling 100 are contemplated, it was determined that the folding sequence depicted in FIG. 2 provided a tear away, or rupturing, initiated from the top of the fold, resulting in release during rupturing from the top of the fold toward the base portion 210 body of the sling, thus controlling the method of tearing/rupturing.

FIG. 3*a* is a conceptual diagram showing a side view of the exemplary sling 100 of FIG. 3*a*. In this exemplary embodiment, first and second folded regions 106, 107 comprise generally regular patterns of stitching 110. The stitching 105 of first folded region 106 may be accomplished using a first pitch 304, and a second pitch 305 used at second folded region 107. Second pitch 305 is shorter than first pitch 304, allowing more stitches per unit length, or per unit area, to support a generally higher threshold rupturing force thereof, assuming other stitching parameters are more or less comparable.

FIG. 3*b* is a conceptual diagram showing an end view of the exemplary sling of FIG. 1, generally reflecting details related to the side view of FIG. 3*a*. Again, first and second folded regions 106, 107 comprise generally regular patterns of stitching 110. The stitching 105 of first folded region 106 uses first pitch 304, and second pitch 305 is used at second folded region 107.

Although a tie back for a crane block load has been used to establish a context for describing an exemplary embodiment of the invention, it is contemplated as having much wider applicability within the field of mufti-staged indicators for progressively increasing overloading conditions. Therefore, varying modifications thereof will be apparent to those skilled in the art, without departing from the scope of the invention as defined by the appended claims.

What is claimed is:

1. An elongated assembly comprising:
   a first end and a second end, the first and second ends respectively including means for accepting a tensile load applied thereto;
   a first folded region audibly/visibly ruptureable at a first threshold loading condition; and
   a second folded region audibly/visibly ruptureable at a second threshold loading condition, the first threshold loading condition being lower than the second threshold loading condition;
   wherein the first and second folded regions are located intermediate the first and second ends.

2. The elongated assembly of claim 1 comprising a flexible elongated assembly.

3. The elongated assembly of claim 2 wherein the first end comprises a hook end and the second end comprises a crane block end.

4. The elongated assembly of claim 1 wherein the means for accepting the tensile load comprises a reinforced eyelet.

5. The elongated assembly of claim 2 wherein the flexible elongated assembly comprises a woven nylon webbing material.

6. The elongated assembly of claim 1 comprising a semi-rigid elongated assembly.

7. The elongated assembly of claim 1 wherein the first and second folded regions are secured by a first region stitching and a second region stitching respectively.

8. The elongated assembly of claim 7 wherein the first and second region stitches are configured to audibly/visibly rupture at the first and second threshold loading conditions respectively.

9. The elongated assembly of claim 7 wherein the first and second stitching regions are different in at least one stitch parameter selected from the group of stitching parameters consisting of: number of stitches, pitch of stitching, stitch thread gauge, stitch thread diameter, stitch thread material, cumulative stitch length and stitch length per unit area.

10. The elongated assembly of claim 1 further comprising a top side a bottom side, wherein the first and second folded regions are co-located on a same one of the top and bottom sides.

11. The elongated assembly of claim 1 wherein the means for accepting the tensile load comprises a loop.

12. The elongated assembly of claim 10 wherein the first and second folded regions are co-located in abutting proximity.

13. The elongated assembly of claim 10 wherein the first and second folded regions comprise a folded length ranging from 3 inches to 8 inches.

14. The elongated assembly of claim 10 further comprising a warning label disposed on any one of the top and bottom sides.

15. The elongated assembly of claim 10 further comprising a user instructions label disposed on any one of the top and bottom sides.

16. A method for indicating a progressively-staged tensile overload condition of an elongated assembly, the method comprising:
   audibly/visibly rupturing a first folded region of the elongated assembly at a first threshold overload condition; and
   audibly/visibly rupturing a second folded region of the elongated assembly at a second threshold overload condition, the first threshold loading condition being lower than the second threshold loading condition.

17. The method of claim 16 further comprising audibly/visibly rupturing at least a third folded region of the elongated assembly at an at least a third threshold loading condition, the first and second threshold conditions being lower than the at least a third threshold loading condition.

18. The method of claim 16 wherein audibly/visibly rupturing the first and second folded regions comprise audibly/visibly rupturing a first region stitching and a second region stitching respectively, the first and second region stitches respectively securing the first and second folded regions.

* * * * *